(12) United States Patent
Lysenkov

(10) Patent No.: US 9,940,504 B2
(45) Date of Patent: Apr. 10, 2018

(54) METHOD TO PRODUCE CONSISTENT FACE TEXTURE

(71) Applicant: Ilya Lysenkov, Nizhny Novgorod (RU)

(72) Inventor: Ilya Lysenkov, Nizhny Novgorod (RU)

(73) Assignee: Itseez3D, Inc., Santa Clara, CA (US)

( * ) Notice: Subject to any disclaimer, the term of this patent is extended or adjusted under 35 U.S.C. 154(b) by 132 days.

(21) Appl. No.: 15/184,564

(22) Filed: Jun. 16, 2016

(65) Prior Publication Data

US 2016/0373724 A1 Dec. 22, 2016

Related U.S. Application Data

(60) Provisional application No. 62/181,119, filed on Jun. 17, 2015.

(51) Int. Cl.
*G06K 9/00* (2006.01)
*G06K 9/52* (2006.01)

(52) U.S. Cl.
CPC ..... *G06K 9/00201* (2013.01); *G06K 9/00228* (2013.01); *G06K 9/52* (2013.01)

(58) Field of Classification Search
CPC ... G06K 9/00201; G06K 9/00228; G06K 9/52
See application file for complete search history.

(56) References Cited

U.S. PATENT DOCUMENTS

| | | | | |
|---|---|---|---|---|
| 2009/0202114 A1* | 8/2009 | Morin | ..................... | A63F 13/12 382/118 |
| 2013/0113956 A1* | 5/2013 | Anderson | ............... | G06F 3/017 348/223.1 |
| 2016/0373724 A1* | 12/2016 | Lysenkov | .......... | G06K 9/00201 |
| 2017/0008650 A1* | 1/2017 | Zhang | ..................... | G01C 21/24 |

* cited by examiner

*Primary Examiner* — Edward Park
(74) *Attorney, Agent, or Firm* — VLP Law Group LLP; Kent H. Cheng

(57) ABSTRACT

The present invention provides a method for the 3D scanning of a person's head.

1 Claim, No Drawings

METHOD TO PRODUCE CONSISTENT FACE TEXTURE

CROSS REFERENCE TO RELATED APPLICATIONS

This application claims the benefit of U.S. Provisional Application No. 62/181,119, filed Jun. 17, 2015, the entire content of which is incorporated by reference.

BACKGROUND OF THE INVENTION

Field of Invention

The present invention relates to a three dimensional scanning of a person's head with reduced artifacts.

The common approach to texturing is to average texture from several frames (e.g. Levoy et al., 2000). This will lead to blurred face texture averaged from several facial expressions and so will not please a user. The other approach to texturing is to map texture for a triangle from a single frame (e.g. Lempitsky & Ivanov, 2007) but it doesn't guarantee that all face triangles will be taken from the same frame and so the problem still remains.

In the present invention we explicitly find the inner part of the face and map texture to it from a single frame and so guarantee consistent face texture. Also, we introduce a special scanning scenario tailored to produce the textured face of the highest quality—the most salient part in a human model. Additionally we developed an algorithm to check whether a face is frontal or not based on depth measurements instead of conventional approaches based on RGB images.

SUMMARY OF THE INVENTION

The present invention addresses the problem of 3D human scanning. The development started by scanning a human as a static object. However, initial experiments showed that if facial texture is synthesized from multiple images, it may result in artifacts, such as eyes looking in different directions. Small artifacts such as a misplacement of one eye a few pixels from its correct location are easily noticed by humans, as humans are very good in perceiving human faces. The artifacts appear either because a person changes a facial expression during the scanning session, or the algorithm produces inaccuracies during texture registration and stitching. So I set out to solve this problem and achieve natural and visually appealing face texture.

The new algorithm aims to produce visually appealing and consistent face texture when scanning humans. The main idea of the proposed algorithm is to detect a frontal face, find facial features and setting a hard requirement that texture for the inner part of a face is taken from a single image. It allows achieving a consistent facial expression of a 3D model so it looks natural. This scheme is suitable for scanning in the most general scenario, which is scanning several people together from an arbitrary position. But we also introduce a special scanning scenario where a user scans a single person and the scanning process has to be started from a frontal face. Additionally, to improve user experience in this scenario, we developed a fast algorithm on a depth image to detect whether a face is frontal. We use it to show a user a hint if he/she is preparing to start scanning when a face is not frontal.

DESCRIPTION OF EMBODIMENTS

The solution of the present invention:
1. Detect a frontal face on a captured image. Any face detector can be used at this stage e.g. a classic approach will do (Viola & Jones, 2001).
2. Find facial landmarks on the detected face. Again, it doesn't matter which particular algorithm is used at this stage e.g. Zhu & Ramanan, 2012.
3. Construct a convex hull around internal face landmarks and dilate it slightly. This mask indicates inner part of the face.
4. Find all visible triangles in a 3D mesh that belong to the produced mask.
5. Map texture for these triangles from this single image.

This scheme guarantees that the produced face texture will be consistent because it is taken from a single frame and so was captured in a single moment in time. We set texture only for the inner part of the face because outer part doesn't change much in different facial expressions and it is better captured from non-frontal frames.

This procedure can be applied in different scenarios when scanning both a single person and several people together. In this case it should be run on each captured frame but the particular frame for texture should be selected by preferring frontal and detailed frame to a face viewed from an angle or blurry frame.

Additionally, we introduce a special scanning scenario when a user is asked to start scanning from a frontal face. It allows the user to move deliberately very close to a person's face at the beginning and hold a camera still during the first shot. This produces a face image of the highest quality. In this case the proposed scheme is applied only to the first frame.

To improve user experience in this scenario, we developed a fast algorithm to detect whether a face is frontal or not. The idea is that frontal face is more symmetric than a profile face and it works as follows:
1. Detect a rectangle containing a face. If a face is not detected then return.
2. Get a depth sub-image for the detected rectangle.
3. If median depth of the face is below a threshold for reliable depth measurements for the used 3D sensor (e.g. 0.5 meter for original Structure Sensor by Occipital Inc.) then return.
4. Compute background mask as a region with invalid depth or where depth values differ from median face depth more than a threshold (0.2 meter in our case).
5. Count a number of pixels in the background mask in the left half of the rectangle and in the right half.
6. If ratio between the minimum count and the maximum count (with Laplace smoothing) is below a threshold (we use 0.005f) than the face is not frontal and we show a user the hint that scanning should be started from a frontal face.

REFERENCES

Viola, P., & Jones, M. (2001). Rapid object detection using a boosted cascade of simple features. In Computer Vision and Pattern Recognition, 2001. CVPR 2001. Proceedings of the 2001 IEEE Computer Society Conference on (Vol. 1, pp. 1-511). IEEE.

Zhu, X., & Ramanan, D. (2012, June). Face detection, pose estimation, and landmark localization in the wild.

In Computer Vision and Pattern Recognition (CVPR), 2012 IEEE Conference on (pp. 2879-2886). IEEE.

Additional References

[1] Levoy, M., Pulli, K., Curless, B., Rusinkiewicz, S., Koller, D., Pereira, L., . . . & Fulk, D. (2000, July). The digital Michelangelo project: 3D scanning of large statues. In Proceedings of the 27th annual conference on Computer graphics and interactive techniques (pp. 131-144). ACM Press/Addison-Wesley Publishing Co.

[2] Callieri, M., Cignoni, P., Corsini, M., & Scopigno, R. (2008). Masked photo blending: Mapping dense photographic data set on high-resolution sampled 3D models. Computers & Graphics, 32(4), 464-473.

[3] Chuang, M., Luo, L., Brown, B. J., Rusinkiewicz, S., & Kazhdan, M. (2009, July). Estimating the Laplace-Beltrami Operator by Restricting 3D Functions. In Computer Graphics Forum (Vol. 28, No. 5, pp. 1475-1484). Blackwell Publishing Ltd.

[4] Lempitsky, V., & Ivanov, D. (2007, June). Seamless mosaicing of image-based texture maps. In Computer Vision and Pattern Recognition, 2007. CVPR'07. IEEE Conference on (pp. 1-6). IEEE.

The invention claimed is:

1. A method for detecting the frontal face of a person, comprising the steps of:
   a) producing a rectangle containing a face;
   b) determining a depth sub-image for the rectangle;
   c) computing a background mask as a region with invalid depth or where depth values differ from median face depth by more than a predetermined threshold;
   d) counting the number of pixels in the background mask in the left half of the rectangle and the number of pixels in the background mask in the right half; and
   e) determining whether the face is frontal by calculating the ratio between the minimum count of pixels and the maximum count of pixels with Laplace smoothing, wherein if the ratio is below a predetermined threshold the face is not frontal.

\* \* \* \* \*